United States Patent [19]
Bishop

[11] Patent Number: 5,724,740
[45] Date of Patent: Mar. 10, 1998

[54] TWIN BLADE SAW

[76] Inventor: John Waldron Bishop, Lot 12 Elleker Road, Albany, W.A. 6330, Australia

[21] Appl. No.: 669,453
[22] PCT Filed: Jan. 9, 1995
[86] PCT No.: PCT/AU95/00010
  § 371 Date: Jul. 8, 1996
  § 102(e) Date: Jul. 8, 1996
[87] PCT Pub. No.: WO95/18691
  PCT Pub. Date: Jul. 13, 1995

[30] Foreign Application Priority Data

Jan. 10, 1994 [AU] Australia .................. PM3272

[51] Int. Cl.⁶ ........................... B23D 47/08
[52] U.S. Cl. ................ 30/375; 30/388; 83/698.61; 83/863
[58] Field of Search ............ 83/863, 665, 698.61, 83/864, 886, 887; 30/375, 388; 144/3.1

[56] References Cited

U.S. PATENT DOCUMENTS

| | | |
|---|---|---|
| 4,128,940 | 12/1978 | Ong . |
| 4,453,312 | 6/1984 | Nishioka . |
| 4,706,535 | 11/1987 | Ducharme ................ 83/863 |
| 5,117,722 | 6/1992 | Letendre ................ 83/863 |
| 5,136,910 | 8/1992 | Kuhn et al. ............... 83/863 |
| 5,148,732 | 9/1992 | Striebig . |
| 5,159,870 | 11/1992 | Fiala ..................... 83/863 |
| 5,287,786 | 2/1994 | Fiala ..................... 83/863 |

FOREIGN PATENT DOCUMENTS

74438/87  12/1987  Australia .
93/03894  3/1993  WIPO .

Primary Examiner—Kenneth E. Peterson
Attorney, Agent, or Firm—Spencer & Frank

[57] ABSTRACT

A portable twin blade saw having adjustment for depth of cut of both blades and adjustments to ensure the saw blades are coplanar and parallel to a straight edge. The twin blade saw comprises a slotted main base (12) with a frame base (14) pivotally attach thereto. The saw blades (68), (82) are mounted on an arm (18) which is pivotally mounted to a plate. The plate is slidably mounted to the frame base (14). The saw blades (68), (82) are both driven by a single motor (90) via a driving arrangement.

8 Claims, 5 Drawing Sheets

TWIN BLADE SAW

FIELD OF THE INVENTION

Portable twin blade saws are known to have advantages in cutting certain materials such as double sided melamine or wood veneers. However, difficulties can arise in portable twin blade saws if the blades are not aligned properly. Typically, cuts are made with a hand-held twin blade saw by moving the saw across a material to be cut whilst an edge of the saw is passed along a straight edge. Typical misalignments include the two saw blades not being co-planar and the saw blades not being parallel to the edge of the twin bladed saw. Further, it is desirable to be able to adjust the height of both blades so that a variable depth of cut can be achieved.

The present invention seeks to provide a portable twin bladed saw which provides adjustment for each of the above types of misalignment.

SUMMARY OF THE INVENTION

According to one aspect of the present invention, there is provided a portable twin blade saw comprising a main base having a slot formed therein, a frame base pivotally attached to the main base and having an apertured section, a member having an aperture formed therein, the member being slidably mounted to the apertured section, an arm and first and second saw blades, the first saw blade being mounted in the aperture of the member and a first aperture of the arm such that the arm pivots about a centre of the first aperture, the second saw blade being mounted in a second aperture of the arm, a driving means arranged such that the first and second saw blades are in driving communication therewith and a motor arranged to drive the first and second saw blades via the driving means.

BRIEF DESCRIPTION OF THE DRAWINGS

The present invention will now be described by way of example, with reference to the accompanying drawings, in which.

DESCRIPTION OF THE INVENTION

Figure 1:
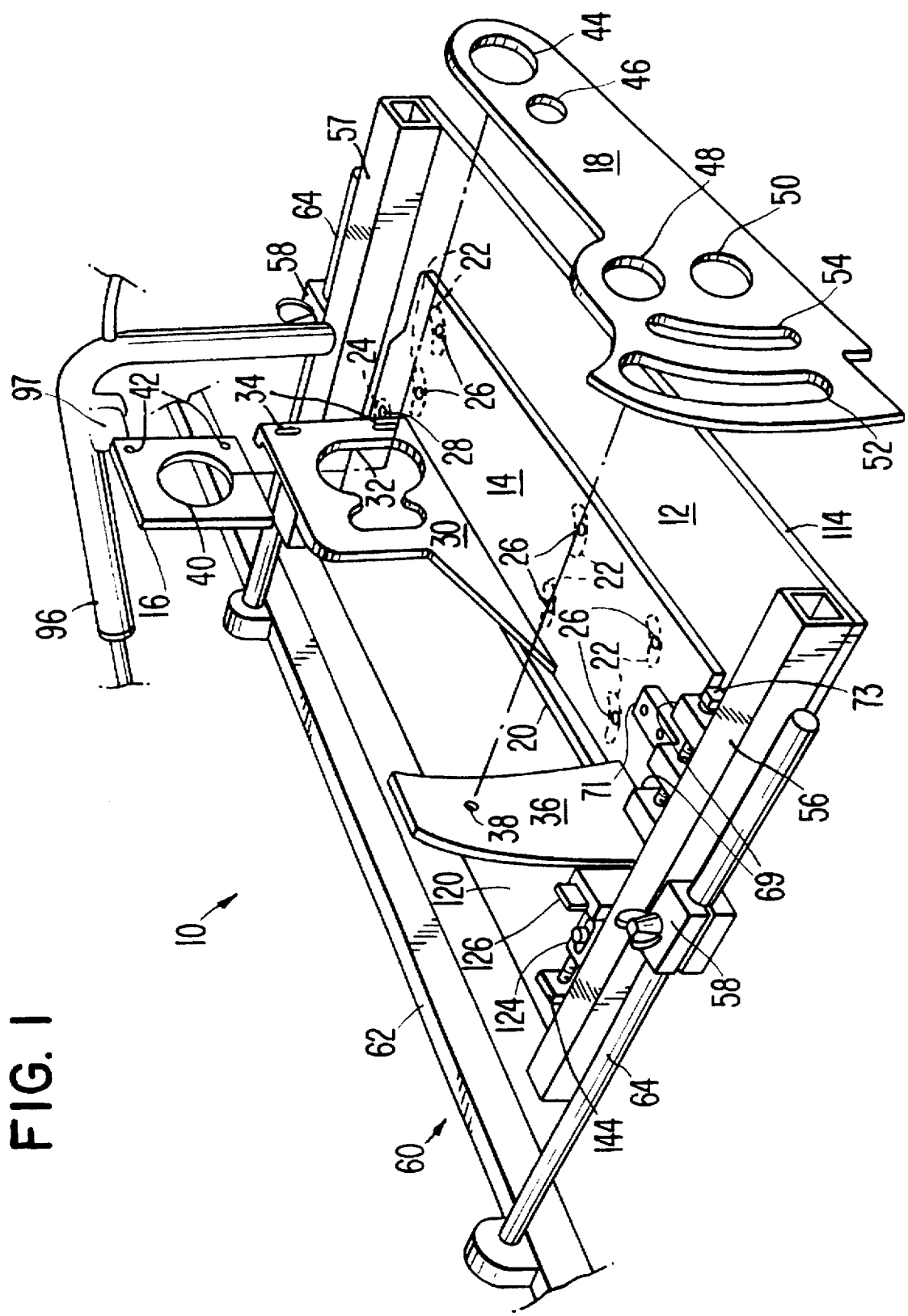
FIG. 1 is an exploded perspective view of the frame of a portable twin blade saw according to the present invention.
Figure 2:
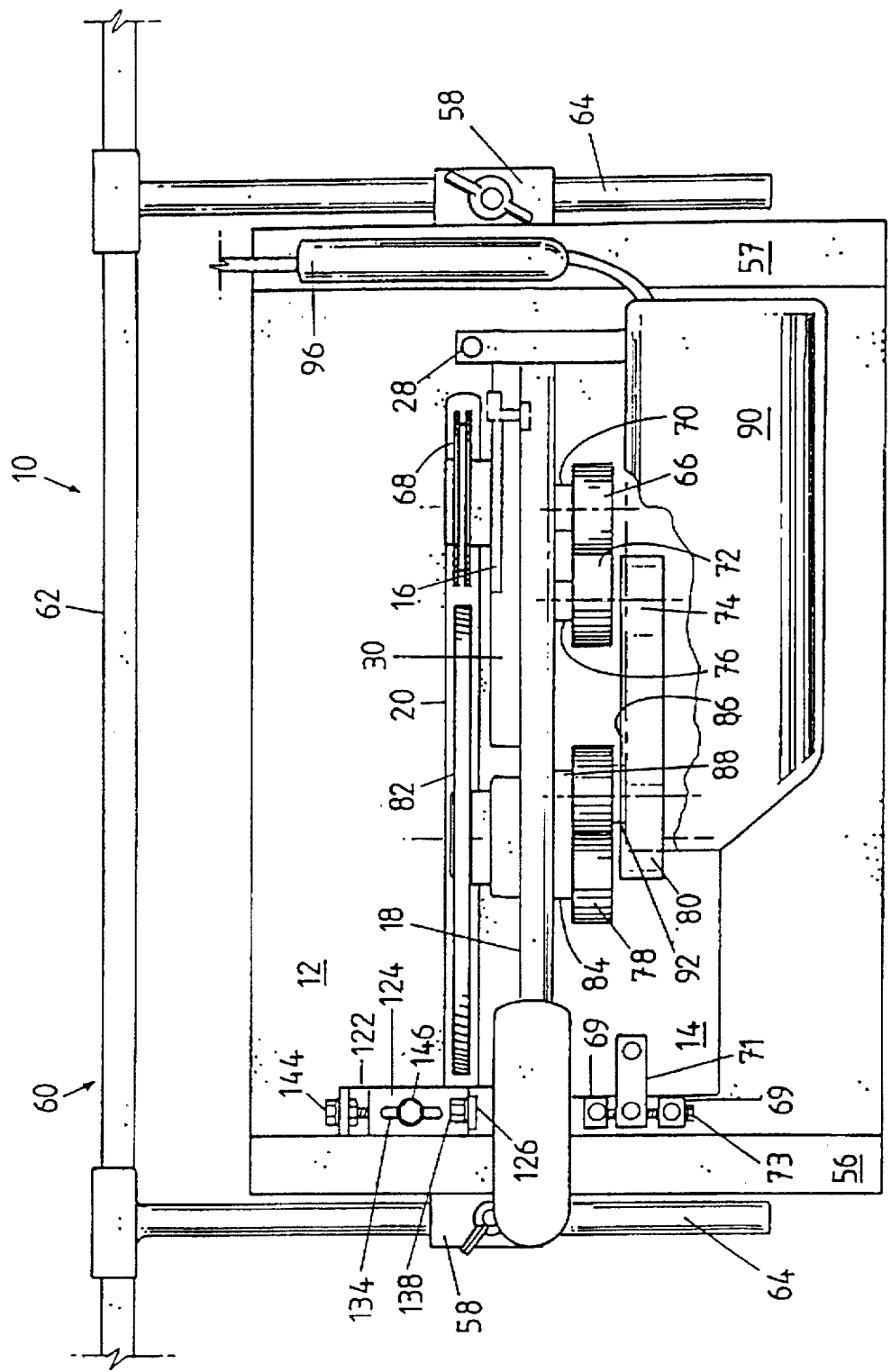
FIG. 2 is a top plan view, with the motor partially broken away, of a portable twin blade saw according to the present invention.
Figure 3:
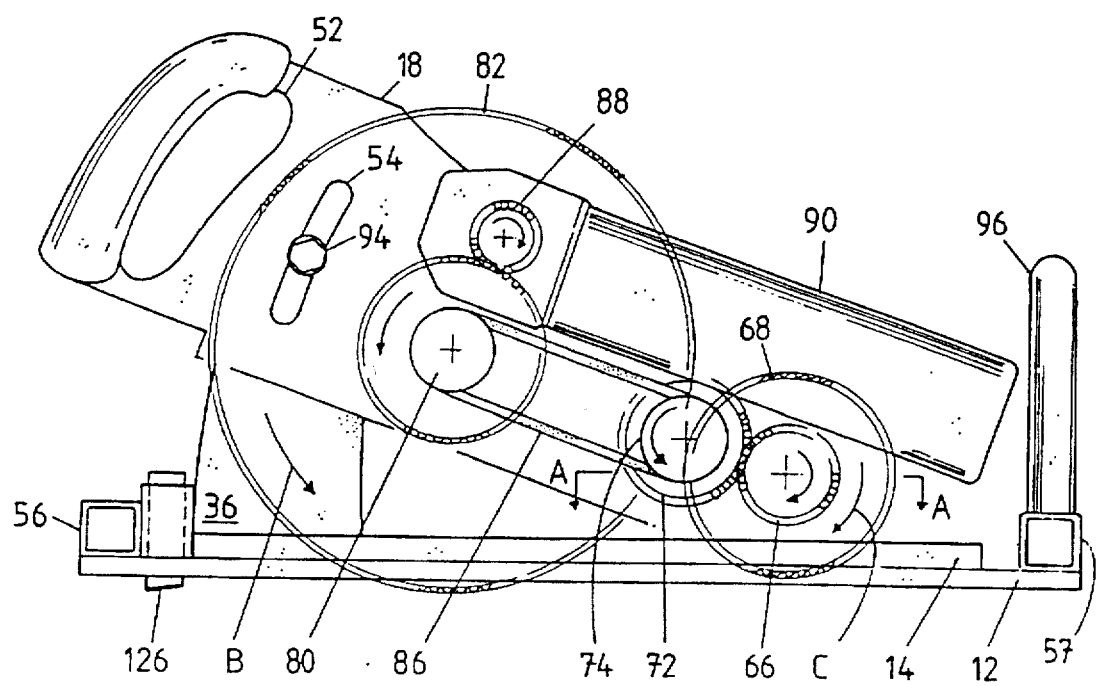
FIG. 3 is a side plan view of the portable twin blade saw shown in FIG. 2.

In the drawings there is shown a portable twin blade saw 10 comprising in part a main base 12, a frame base 14, member 16 and an arm 18. The main base 12 has a slot 20, arcuate slots 22 (not shown) and an aperture 24 (not shown) formed therein. The frame base 14 has apertures 26 and an aperture 28 formed therein. The frame base 14 includes a section 30 having an aperture 32 and slots 34 formed therein and a further section 36 having an aperture 38 formed therein.

The member 16 has an aperture 40 and apertures 42 formed therein. The arm 18 has apertures 44,46,48,50,52 and an arcuate slot 54 formed therein.

The main base 12 has tubular members 56 and 57 attached at opposing sides thereof. A clamp 58 is attached to each of the members 56 and 57. A fence 60, comprising a member 62 and a pair of rods 64 attached to the member 62 in a spaced apart manner, is attached to the main base 12 by means of the rods 64 being engaged by the clamps 58. The frame base 14 is attached to the main base 12 by a bolt passing through the aligned apertures 24 and 28. Further, each of the apertures 26 is then aligned with one of the arcuate slots 22. A bolt passes through each aligned aperture 26 and arcuate slot 22. The first section 30 and the second section 36 extend outwardly from the main base 12 when the frame base 14 is attached thereto. The member 16 is slidably mounted to the first section 30 by bolts passing through the apertures 42 and slots 34.

A gear 66 and a first saw blade 68 are mounted on a shaft 70. The shaft 70 extends through the aperture 44 of the second member 18, the aperture 32 of the first section 30 and the aperture 40 of the member 16. The first saw blade 68 is substantially aligned with the slot 20 of the main base 12 and projects partially therethrough.

A reversing gear 72 and a pulley 74 are mounted on a shaft 76. The shaft 76 is mounted on the arm 18 and passes through the aperture 46. The gear 66 and the reversing gear 72 are in geared communication.

A gear 78, a pulley 80 and a second saw blade 82 are mounted on a shaft 84. The shaft 84 is mounted on the arm 18 and extends through the aperture 50. The second saw blade 82 is substantially aligned with the slot 20 in the main base 12 and extends partially therethrough. The pulley 80 and the pulley 74 are in communication via a belt 86. A driving gear 88 is attached to a shaft 92. The shaft 92 is attached to the arm 18 and extends through the aperture 48. A motor 90 drives the driving gear 88. The driving gear 88 is in geared communication with the gear 78.

The gears 66,72,78 and 88, the pulleys 74 and 80 and the belt 86 comprise a driving means.

Two members 69 are spaced apart and attached to the main base 12 adjacent the member 56. A member 71 is attached to the frame base 14 and extends between the members 69 along part of the length thereof. The two members 69 each have an aperture formed therein and the member 71 has a threaded aperture formed therein. A bolt 73 extends through the apertures in the members 69 and 71 and threadedly engages with the member 71. The bolt 73 is freely rotatable in the apertures on the members 69.

A locking knob 94 passes through the arcuate slot 54 and threadedly engages with the aperture 38. A handle 96 is attached to the member 57. A switch 97 is mounted on the handle 96. The switch 97 is used to activate the motor 90.

Figure 4:
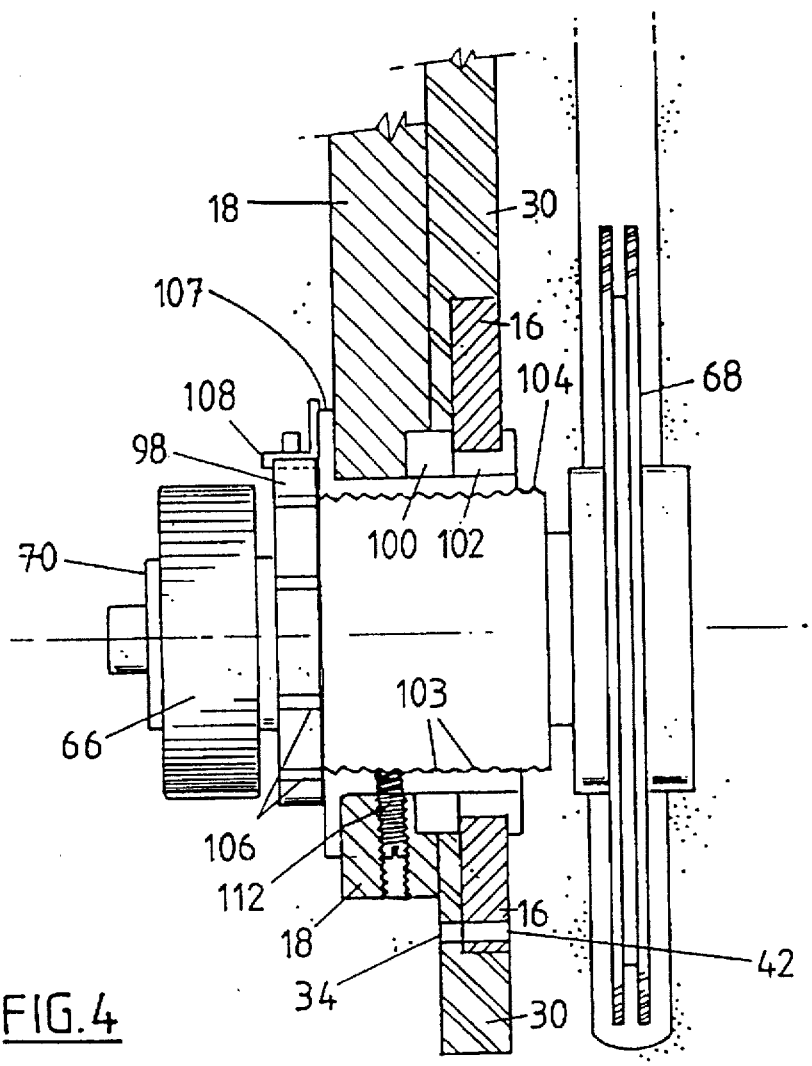
FIG. 4 is a cross-sectional view through section A-A in FIG. 3.
Figure 5:
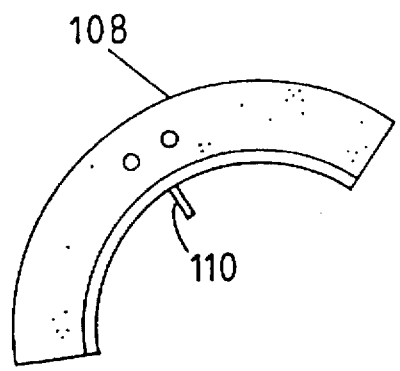
FIG. 5 is a side plan view of the locking pin shown in FIG. 4.
Figure 6:
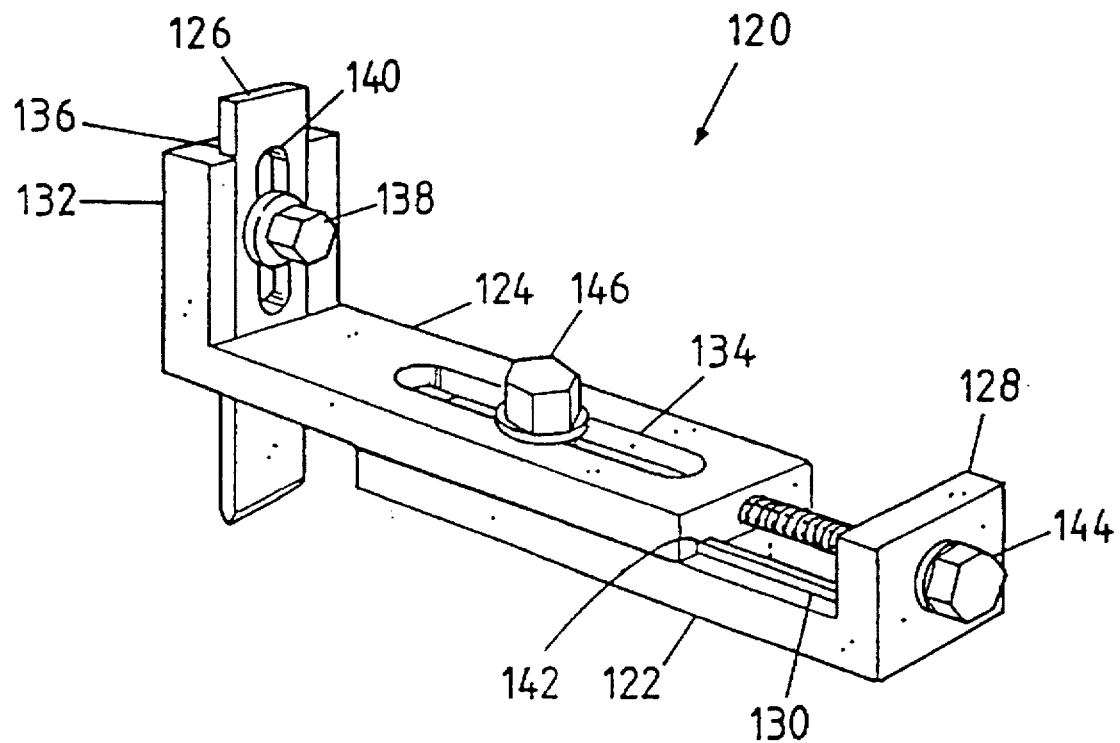
FIG. 6 is a perspective view of the knife arrangement of the portable twin blade saw of FIG. 2.

Locking rings 100 and 102 having apertures formed therein are located in the apertures 44, 32 and 40. The locking rings 100 and 102 lock onto the member 18 and pivot about the member 16. A sleeve 107 is provided in the perture 44 and the apertures of the locking rings 100 and 102 as shown in FIG. 4. The sleeve 107 has a threaded internault surface 103. A disc 98 and a bearing housing 104 are also mounted on the shaft 70. The bearing housing 104 is externally threaded. The bearing housing 104 threadedly engages with the threaded internal surface 103 of the sleeve 107. The disc 98 has grooves 106 formed thereon at regular intervals around the circumference thereof. The bearing housing 104 is attached to the disc 98. A locking plate 108 is releasably attached to the arm 18. The locking plate 108 has a protuberance 110 formed thereon. When the locking plate 108 is attached to the arm 18, the protuberance 110 is received within a groove 106 of the disc 98, thereby preventing rotation of the disc 98 and the bearing housing 104. A nylon ended grub screw 112 is located within a further aperture of the arm 18 and threadedly engages the bearing housing 104 as shown in FIG. 4. The grub screw 112 prevents chattering (vibrational movement) of the threads on the bearing housing 104 of the sleeve 107 when the saw 10 is in use, thereby preventing damage to the threads.

A knife arrangement 120 comprising a base member 122, a member 124 and a knife 126 is further provided. The base member 122 has an upstanding section 128 in which an aperture is formed. A rib 130 is provided on the base member 122.

The member 124 includes an upstanding section 132. A slot 134 is formed in the member 124. The upstanding section 132 has a recessed portion 136. An aperture is formed in the member 124 in communication with the recessed portion 136.

The knife 126 is positioned in the recessed portion 136 and projects through the aperture in the member 124. The knife 126 is held in place by a bolt 138 passing through a slot 140 in the knife 126 to engage the upstanding section 132.

A further recessed portion 142 is provided on the member 124. The member 124 is positioned on the base member 122 such that the rib 130 is received by the further recessed portion 142.

A bolt 144 passes through an aperture in the upstanding section 128 and threadedly engages the member 124. The bolt 144 freely rotates within the aperture in the upstanding section 128. By turning the bolt 144, the member 124 moves longitudinally along the base member 122. About 146 is provided to hold the member 124 with respect to the base member 122. The bolt 146 is positioned in the slot 134 and engages the base member 122. The knife arrangement 120 is provided in the twin blade saw 10. The base member 122 is attached to the main base 12. The knife 126 projects into the slot 20 adjacent the tubular member 56. By loosening the bolt 138, the depth of the knife 126 in the slot 20 can be altered. Loosening the bolt 146 allows alignment of the knife 126 with the second saw blade 82 by use of the bolt 144. The bolt 144 moves the knife 126 in a transverse direction in the slot 20. The bolt 146 is tightened when the knife 126 is aligned with the second saw blade 86 to prevent unwanted movement.

In use, the first saw blade 68 rotates in a direction indicated by the arrow C and the second saw blade 82 rotates in a direction indicated by the arrow B.

It is desirable to ensure that the saw blades 68 and 82 are aligned to ensure the cleanest possible cut is obtained. Adjusting the depth of cut of the first saw blade 68 is achieved as follows.

Firstly, the bolts mounting the member 16 to the first section 30 are loosened. The member 16 is then moved relative to the first section 30. Since the shaft 70 passes through the aperture 40 in the member 16, moving the member 16 also moves the shaft 70 correspondingly, thereby moving the first saw blade 68. When the first saw blade 68 projects by a desired mount through the main base 12, the bolts in the slots 34 are then tightened to again fixedly mount the member 16 to the first section 30.

By loosening the locking knob 94, the arm 18 can be pivoted about an axis passing through the shaft 70. Thus, the depth of cut of the second saw blade 82 can be adjusted by loosening the locking knob 94 and pivoting the arm 18. When the second saw blade 82 projects through the main base 12 by a desired mount, the locking knob 94 can be tightened thereby securing the arm 18 in a fixed position relative to the time base 14. Typically, a straight line cut is achieved by passing the portable twin blade saw 10 across a material to be cut whilst either a leading edge 114 is kept against a straight edge or the fence 60 is kept against an edge of the material being cut. The fence 60 is used when it is desired to cut a strip of material too narrow to use a straight edge. However, to achieve an even cut, it is necessary to ensure that the saw blades 68 and 82 are in a plane parallel to the leading edge 114 or the fence 60. The plane of cut of the saw blades 68 and 82 can be adjusted in the portable twin blade saw 10 of the present invention as follows.

Firstly, the bolts passing through each aligned aperture 26 and arcuate slot 22 are loosened. The frame base 14 is then pivotable about the bolt passing through the apertures 28 and 24. Adjustment is achieved by turning the screw 73. Turning the screw 73 moves the member 71 and therefore the frame base 14 along the length of the screw 73. Thus, the frame base 14 is pivoted about the aperture 28. Since the saw blades 68 and 82 are mounted via the frame base 14, the plane of cut of the saw blades 68 and 82 is thereby also rotated. When the frame base 14 has been rotated a desired amount, so that the saw blade 68 and 82 are parallel to the leading edge 114, the bolts in the apertures 26 and 22 are again tightened to ensure the frame base 14 does not further pivot during use.

Finally, it is necessary to ensure that the saw blades 68 and 82 are co-planar and this is achieved as follows.

Firstly, the locking plate 108 is removed from the portable twin blade saw 10. The grub screw 112 is then undone. The disc 98 and the bearing housing 104 can then freely rotate. By rotating the disc 98 and bearing housing 104, the shaft 70 and thus the first saw blade 68 is moved in a transverse direction. Thus, the first saw blade 68 can be moved in a transverse direction to ensure that the first saw blade 68 is co-planar with the second saw blade 82.

When the bearing housing 104 has been rotated by a suitable amount, the grub screw 112 and locking plate 108 are replaced to ensure that the bearing housing 104 does not rotate during use and thereby ensuring the alignment of the first saw blade 68 with the second saw blade 82. The protuberance 110 on the locking plate 108 engages with one of the grooves 106. Thus, the movement of the disc 98 to effect the adjustment is incremental as one of the grooves 106 has to be appropriately aligned to receive the protuberance 110. The knife 126 is adjusted as previously described so that the knife 126 is aligned with the saw blades 68 and 82. The knife 126 prevents the material being cut from pinching the second saw blade 82.

Thus, it can be seen that the portable twin blade saw 10 of the present invention provides adjustments to ensure that the portable twin blade saw 10 provides a clean cut. The adjustments provided allow vertical adjustment of both the saw blades 68 and 82, the rotation of the plane of cut of the saw blades 68 and 82 and adjustments to ensure that the saw blades 68 and 82 are co-planar.

Modifications and variations such as would be apparent to a skilled addressee are deemed within the scope of the present invention.

For example, the saw blades 68 and 82 may be single blades or dual blades.

The claims defining the invention are as follows:

1. A portable twin blade saw comprising a horizontal main base having a slot formed therein, a frame base horizontally pivotally attached to the main base and having an apertured section, a member having an aperture formed therein, the member being vertically slidably mounted to the apertured section, an arm and first and second saw blades, the first saw blade having a first saw blade shaft mounted in the aperture of the member and in a first aperture of the arm such that the arm pivots about a centre of the first aperture, the second saw blade having a second saw blade shaft mounted in a second aperture of the arm, a driving means arranged such that the first and second saw blades are in driving communication with said driving means and a motor arranged to drive the first and second saw blades via the driving means.

2. A portable twin blade saw according to claim 1, characterised in that the first saw blade shaft rotatably mounted in a bearing housing, said bearing housing being is threadedly mounted in the aperture of the member and the first aperture of the arm, wherein the first saw blade is threadedly movable in a direction transverse to the slot in the main base.

3. A portable twin blade saw according to claim 1, characterised in that the frame base further comprises a further apertured section, wherein the arm is arranged to be releasably fixed to the further apertured section.

4. A portable twin blade saw according to claim 1, characterised in that the driving means comprises a gear and pulley arrangement arranged so that the first and second saw blades rotate in opposite directions.

5. A portable twin blade saw according to claim 1, characterised in that the twin blade saw includes a knife arrangement comprising a base member, a member and a knife, the member being slidably mounted on the base member, the knife being slidably mounted on the member, wherein the base member is attached to the main base such that the knife is positioned in the slot in the main base and projects partially therethrough.

6. A portable twin blade saw according to claim 1, characterised in that the frame base is pivotally attached to the main base at a pivot point, a pivot adjustment means provided remote from the pivot point to control pivotal movement of the frame base.

7. A portable twin blade saw according to claim 6, characterised in that the pivot adjustment means comprises a pair of spaced apart apertured members attached to the main base and a further apertured member attached to the frame base, the further apertured member extending between the pair of apertured members, and a bolt passing through the apertures in the pair of separated members and threadedly engaging with the aperture in the further apertured member.

8. A portable twin blade saw according to claim 1, characterised in that there is provided an arcuate slot in the main base and a further aperture in the frame base, wherein a bolt is provided in the arcuate slot and the further aperture in the frame base to prevent pivotal movement of the frame base.

* * * * *